(12) United States Patent
Anderson et al.

(10) Patent No.: US 7,363,316 B2
(45) Date of Patent: Apr. 22, 2008

(54) SYSTEMS AND METHODS FOR ORGANIZING AND MAPPING DATA

(75) Inventors: Curtis Anderson, Saratoga, CA (US); John P. Woychowski, Los Altos Hills, CA (US)

(73) Assignee: Mendocino Software, Inc., Fremont, CA (US)

( * ) Notice: Subject to any disclaimer, the term of this patent is extended or adjusted under 35 U.S.C. 154(b) by 35 days.

(21) Appl. No.: 11/166,690

(22) Filed: Jun. 23, 2005

(65) Prior Publication Data

US 2006/0047694 A1    Mar. 2, 2006

Related U.S. Application Data

(60) Provisional application No. 60/605,168, filed on Aug. 30, 2004.

(51) Int. Cl.
*G06F 17/30* (2006.01)
(52) U.S. Cl. .................. 707/102; 707/103 R; 707/200; 707/202; 707/204; 714/2; 714/4; 711/13; 711/162
(58) Field of Classification Search ................ 707/202, 707/204, 203
See application file for complete search history.

(56) References Cited

U.S. PATENT DOCUMENTS

| 5,297,269 A * | 3/1994 | Donaldson et al. ......... 711/145 |
|---|---|---|
| 5,875,444 A | 2/1999 | Hughes |
| 6,192,051 B1 | 2/2001 | Lipman et al. |
| 6,915,340 B2 | 7/2005 | Tanaka |
| 2002/0120824 A1 | 8/2002 | Hooper, III |
| 2004/0064463 A1 | 4/2004 | Rao et al. |
| 2005/0097128 A1 | 5/2005 | Ryan et al. |
| 2005/0138160 A1 | 6/2005 | Klein et al. |
| 2005/0203930 A1 | 9/2005 | Bukowski et al. |
| 2005/0246397 A1 | 11/2005 | Edwards et al. |

OTHER PUBLICATIONS

Bodorik et a. Recovery virtual memory through the multi-view memory computer system, System Science, 1999, Proceeding of the 32 nd Annual International Conference, vol. 3, pp. 10 pages, date: Dec. 5-8, 1999.*

Guo et al. A system framework and key techniques of fragments assembly for restoration of historical relics based on grid, Virtual Reality Continuum And its Application, Proceedings of the 2006 ACM international conference on Virtual reality continuum and its applications, pp. 387-390, date: 2006.*

(Continued)

*Primary Examiner*—John Breene
*Assistant Examiner*—Baoquoc N To
(74) *Attorney, Agent, or Firm*—Carr & Ferrell LLP

(57) ABSTRACT

A system and method is provided for organizing and mapping data. In exemplary embodiments, a copy of at least one first data block created from a first computing device is generated. A copy of one or more second data blocks created from one or more second computing devices utilizing the copy of the at least one first data block is also generated. The copy of the at least one first data block is related to the copy of the one or more second data blocks in a branching data structure. The copy of the at least one first data block and the copy of the one or more second data blocks is mapped to a storage medium via an index associated with the branching data structure.

30 Claims, 5 Drawing Sheets

OTHER PUBLICATIONS

U.S. Appl. No. 11/216,874, Curtis Anderson, Systems and Methods for Rapid Presentation of Historical Views of Stored Data, filed Aug. 30, 2005.

U.S. Appl. No. 11/215,958, Curtis Anderson, Systems and Methods for Event Driven Recovery Management, filed Aug. 30, 2005.

U.S. Appl. No. 11/215,930, Curtis Anderson, Systems and Methods for Optimizing Restoration of Stored Data, filed Aug. 30, 2005.

U.S. Appl. No. 11/216,439, Curtis Anderson, Protocol for Communicating Data Block Copies in an Error Recovery Environment, filed Aug. 30, 2005.

Satyanarayanan, M., "The Evolution of Coda", ACM Transactions on Computer Systems, 20, 2, 85 (40), May 2002.

* cited by examiner

SYSTEMS AND METHODS FOR ORGANIZING AND MAPPING DATA

CROSS-REFERENCE TO RELATED APPLICATIONS

The present application claims the benefit and priority of U.S. provisional patent application Ser. No. 60/605,168, filed on Aug. 30, 2004, and entitled "Image Manipulation of Data," which is herein incorporated by reference.

BACKGROUND OF THE INVENTION

1. Field of the Invention

The present invention relates generally to recovery management, and more particularly to systems and methods for organizing and mapping data.

2. Description of Related Art

Conventionally, recovery management has been overseen by various systems that keep track of data being written to a storage medium. Recovery management may be necessary to recover data that has been altered by a disk crash, a virus, erroneous deletions, overwrites, and so on. Numerous other reasons are cited by companies and individuals for requiring access to data as it existed at one point in time.

Back-up methods for storing data are necessary before the data can be recovered. Back-up methods may include the activity of copying files or databases so that they will be preserved in case of equipment failure or other catastrophe. Some processes may involve copying backup files from backup media to hard disk in order to return data to its original condition. Other techniques may include an ability to periodically copy contents of all or a designated portion of data from the data's main storage device to a cartridge device so the data will not be lost in the event of a hard disk crash.

Backup procedures, such as those described above, require a great deal of processing power from the server performing the backups. For this reason, backup procedures may be offloaded from a server so that the time ordinarily devoted to backup functions can be used to carry out other server tasks. For example, in some environments, an intelligent agent may be utilized to offload the backup procedures. The intelligent agent may take a "snapshot" of a computer's data at a specific time so that if future changes cause a problem, the system and data may be restored to the way they were before the changes were made.

Once copies of the data have been made in some manner, data recovery may be utilized to recover the data using the copies. Data recovery seeks to return the data to a state before particular changes were made to the data. Thus, the data may be recovered to different points in time, depending upon the state of the data a user may want to access. However, locating the data to the different points in time can be a long and arduous process.

The user may utilize the recovered data for a variety of tasks, such as studying the data to determine possible causes of software program errors or bugs. However, different users often cannot readily locate and utilize data recovered from other users. Further, determining how data created by other users may relate to other data is frequently a difficult or impossible task.

Therefore, there is a need for a system and method for organizing and mapping data.

SUMMARY OF THE INVENTION

The present invention provides a system and method for organizing and mapping data. According to an exemplary method, A copy of at least one first data block created from a first computing device is generated. A copy of one or more second data blocks created from one or more second computing devices utilizing the copy of the at least one first data block is also generated. The copy of the at least one first data block is related to the copy of the one or more second data blocks in a branching data structure. The copy of the at least one first data block and the copy of the one or more second data blocks is mapped to a storage medium via an index associated with the branching data structure.

DESCRIPTION OF EXEMPLARY EMBODIMENTS

Figure 1:
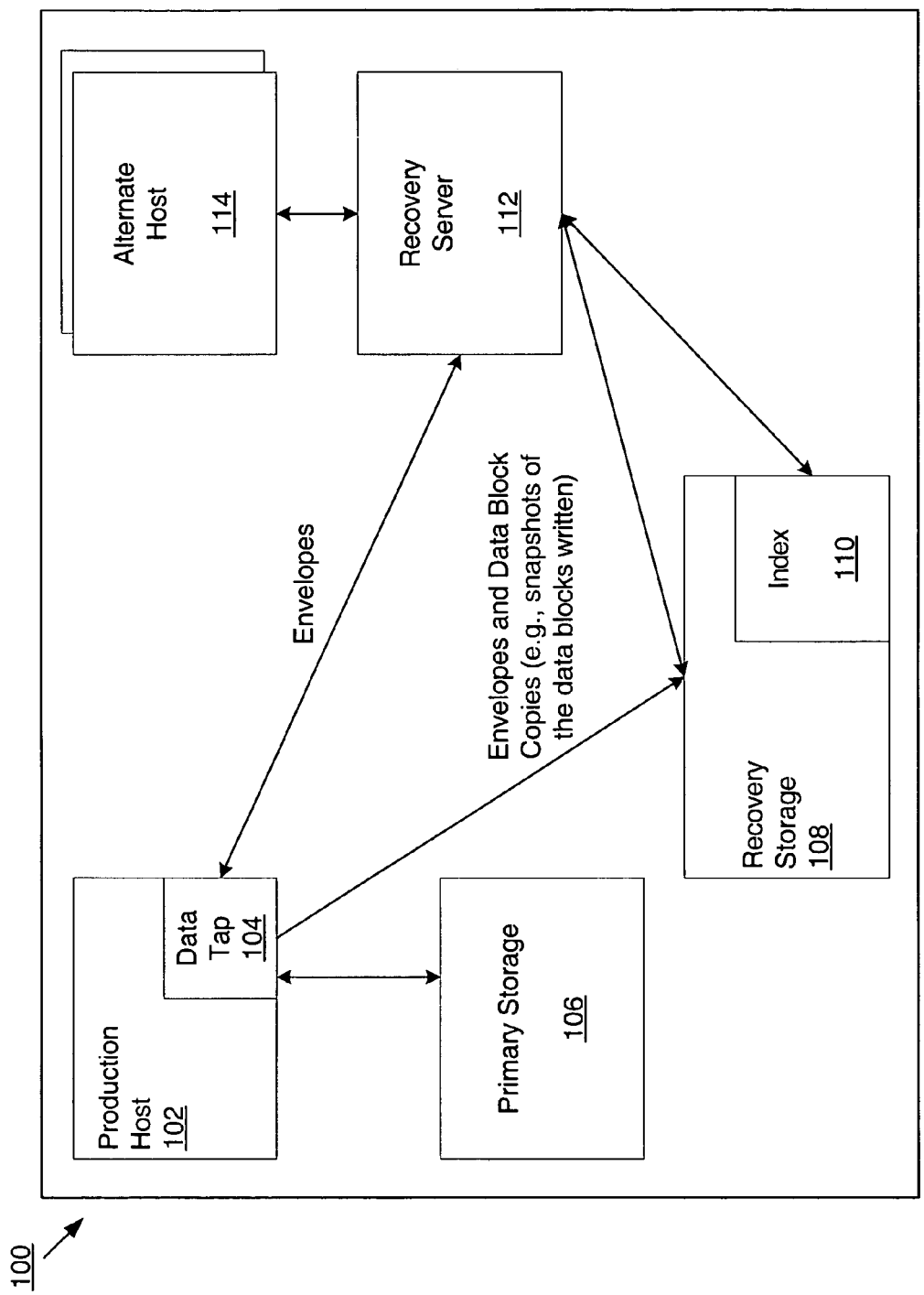
FIG. 1. shows a schematic illustration of an exemplary environment for providing branching data structures for mapping data storage.

FIG. 1 is a schematic diagram of an environment for organizing and mapping data in accordance with exemplary embodiments. Fibre Channel (FC) may be utilized to transmit data between the components shown in FIG. 1. However, any type of system (e.g., optical system), in conjunction with FC or alone, may be utilized for transmitting the data between the components.

The exemplary environment 100 comprises a production host 102 for creating various types of data. For example, a financial software program running on the production host 102 can generate checkbook balancing data. Any type of data may be generated by the production host 102. Further, the production host 102 may include any type of computing device, such as a desktop computer, a laptop, a server, a personal digital assistant (PDA), and a cellular telephone. In a further embodiment, a plurality of production hosts 102 may be provided.

The production host 102 may include a data tap 104. The data tap 104 may be any hardware, software, or firmware that resides on the production host 102, or otherwise accesses the data generated by the production host 102. For example, the data tap 104 may be embedded in a SAN switch or a disk array controller. According to exemplary embodiments, the data tap 104 may be coupled to, or reside on, one or more production hosts 102. Conversely, in some embodiments, the production host 102 may include or be coupled to more than one data tap 104.

The data tap 104 copies data created by the production host 102 and stores the data ("data blocks") in a primary storage 106 associated with the production host 102. The copies of the data blocks ("data block copies") are stored to recovery storage 108. The recovery storage 108 may comprise any type of storage, such as time addressable block storage. ("TABS"). Although "data blocks" and "data block copies" is utilized to describe the data created and the copies of the data generated, files, file segments, data strings and any other data may be created and copies generated according to various embodiments. Further, the data blocks and the data block copies may be a fixed size or varying sizes.

The primary storage 106 and/or the recovery storage 108 may include random access memory (RAM), hard drive memory, a combination of static and dynamic memories, or any other memory resident on the production host 102 or coupled to the production host 102. The primary storage 106 may include any storage medium coupled to the production host 102 or residing on the production host 102. in one embodiment, the data tap 104 may store the data blocks to more than one of the primary storage 106. A computer readable medium may comprise the RAM, hard drive memory, a combination of static and dynamic memories, and/or any other memory.

The primary storage 106 and/or the recovery storage 108 may include random access memory (RAM), hard drive memory, a combination of static and dynamic memories, or any other memory resident on the production host 102 or coupled to the production host 102. The primary storage 106 may include any storage medium coupled to the production host 102 or residing on the production host 102. In one embodiment, the data tap 104 may store the data blocks to more than one of the primary storage 106.

According to one embodiment, the data tap 104 can create data block copies from the data blocks after the production host 102 stores the data blocks to the primary storage 106 or as the data blocks are generated by the production host 102.

Data blocks are typically created from the production host 102 each instant a change to existing data at the primary storage 106 is made. Accordingly, a data block copy may be generated each time the data block is generated; according to exemplary embodiments. In another embodiment, the data block copy may comprise more than one data block. Each data block copy and/or data block may reflect a change in the overall data comprised of the various data blocks in the primary storage 106.

In exemplary embodiments, the data tap 104 intercepts each of the data blocks generated by the production host 102 in order to create the data block copies. The data block is sent to the primary storage 106 by the data tap 104, while the data tap 104 sends the data block copy to the recovery storage 108, as discussed herein. The data block copies may be combined to present a view of data at a recovery point (i.e., as the data existed at a point in time), called a "historical view." In other words, the data block copies may be utilized to re-create the data (i.e., the data blocks stored in the primary storage 106) as it existed at a particular point in time. The "historical view" of the data may be provided to a user requesting the data as a "snapshot" of the data. The snapshot may comprise an image of the data block copies utilized to create the historical view, according to one embodiment.

In an alternative embodiment, the data tap 104, or any other device, may compare the data blocks being generated with the data blocks already stored in the primary storage 106 to determine whether changes have occurred. The copies of the data blocks may only be generated when changes are detected.

The historical view may also be used to present an image of all of the data in the primary storage 106 utilizing some of the data block copies in the recovery storage 108 and some of the data blocks in the primary storage 106. In other words, the historical view at time x may comprise all of the data in the primary storage 106 and/or the recovery storage 108. In some embodiments, the data block copies from the recovery storage 108 may be combined with the data blocks from the primary storage 106 in order to create the historical view. Accordingly, the historical view may be comprised of data blocks from the primary storage 106 and data block copies from the recovery storage 108 with both the data blocks and the data block copies contributing to the overall historical view.

In one embodiment, the production host 102 reserves private storage or temporary storage space for the data tap 104. The private storage space may be utilized by the data tap 104 for recording notes related to the data blocks, for temporarily storing the data block copies, or for any other purpose. For instance, if the recovery server 112 is not available to instruct the data tap 104 where to store the data block copies in the recovery storage 108, the temporary storage may be utilized to store the data block copies until the recovery server 112 is available.

Similarly, the temporary storage may be utilized to store the data block copies if the recovery storage 108 is unavailable. Once the recovery server 112 and/or the recovery storage 108 is once again available, the data block copies may then be moved from the temporary storage to the recovery storage 108 or any other storage.

In another embodiment, the data tap 104, using a bit map or any other method, tracks the data blocks from the production host 102 that change. Accordingly, if the recovery server 112 and/or the recovery storage 108 is unavailable, the data tap 104 records which blocks on the primary storage 106 change. The data tap 104 can copy only the data blocks from the primary storage 106 to the recovery storage 108 that changed while the recovery server 112 and/or the recovery storage 108 were unavailable. Specifically, the data tap 104 or any other device flags each data block generated by the production host 102 that changes. The flags are referenced when the recovery server 112 and/or the recovery storage 108 are available to determine which data blocks were changed during the time the recovery server 112 and/or the recovery storage 108 were unavailable. Although each data block may change more than one time, each of the data blocks reflecting the most recent change to the data blocks when the recovery server 112 and/or the recovery storage 108 become available are the data blocks that are copied to the recovery storage 108 from the primary storage 106.

In yet another embodiment, the data tap 104 may continue to store the data block copies to an area of the recovery storage 108 allocated for data block copies from the data tap 104 by the recovery server 112 prior to the recovery server 112 becoming unavailable. In other words, if the recovery server 112 is unavailable, but the recovery server 112 has previously instructed the data tap 104 to store the data block copies to a specified area of the recovery storage 108, the data tap 104 can continue to store the data block copies to the specified area until the specified area is full and/or the recovery server 112 becomes available.

In still a further embodiment, a backup recovery server may be provided to provide the recovery server 112 functions if the recovery server 112 is unavailable. As discussed herein, more than one recovery server 112 may be provided. Similarly, more than one production host 102 may be provided, as a set of computing devices or other configuration, with other production hosts 102 capable of performing functions associated with the production host 102 in the event the production host 102 becomes unavailable.

The exemplary data tap 104 also creates metadata in one or more "envelopes" to describe the data block copies and/or the data blocks. The envelopes may include any type of metadata. In exemplary embodiments, the envelopes include metadata describing the location of the data block in the primary storage 106 (i.e., a logical block address "LBA"), the size of the data block and/or the data block copies, the location of the data block copy in the recovery storage 108, or any other information related to the data. In exemplary embodiments, the envelopes associated with the data block copies preserve the order in which the data blocks are created by including information about the order of data block creation by the production host 102.

The data tap 104 forwards the envelopes to a recovery server 112. The data tap 104 may associate one or more unique identifiers, such as a snapshot identifier ("SSID"), with the data block copies to include with one or more of the envelopes. Alternatively, any device can associate the unique identifiers with the one or more envelopes, including the data tap 104. The recovery server 112 may also designate areas of the recovery storage 108 for storing one or more of the data block copies in the recovery storage 108 associated with the one or more envelopes. When the data tap 104 stores the data block copies to the recovery storage 108, the data tap 104 can specify in the associated envelopes where the data block copy was stored in the recovery storage 108. Alternatively, any device can designate the physical address for storing the data block copies in the recovery storage 108.

The unique identifiers may be assigned to single data block copies or to a grouping of data block copies. For example, the recovery server 112 or other device can assign the identifier to each data block copy after the data block copy is created by the data tap 104, or the unique identifier may be assigned to a group of the data block copies.

Figure 3:
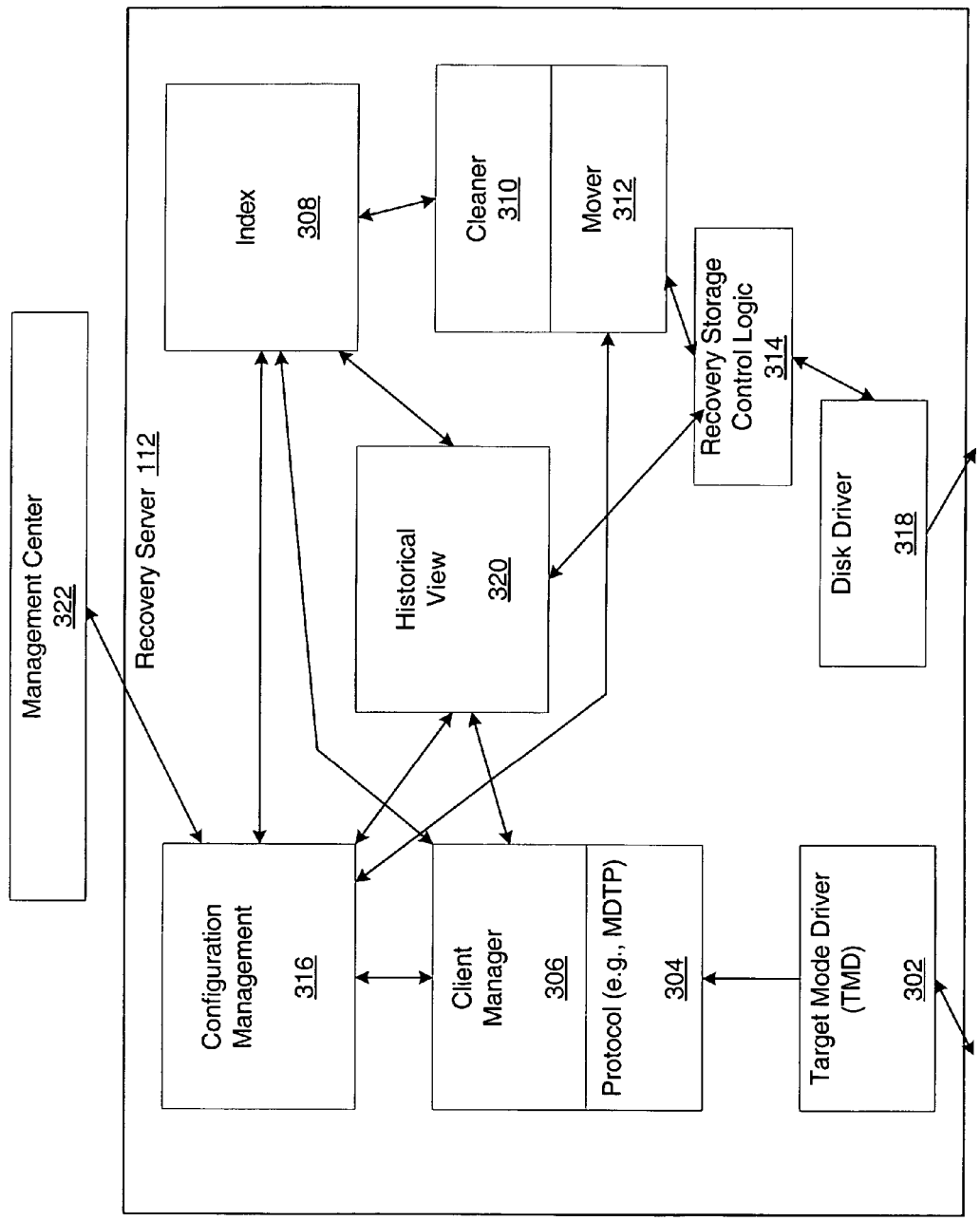
FIG. 3 shows an exemplary schematic diagram for recovery server coordination of historical views.

The recovery server 112 uses the envelopes to create a recovery index (discussed infra in association with FIG. 3). The recovery server 112 then copies the recovery index to the recovery storage 108 as an index 110. The index 110 maps the envelopes to the data block copies in the recovery storage 108. Specifically, the index 110 maps unique identifiers, such as addresses or sequence numbers, to the data block copies using the information included in the envelopes. In alternative embodiments, the index 110 may be stored in other storage mediums or memory devices coupled to the recovery storage 108 or any other device.

In exemplary embodiments, the data tap 104 forwards the data block copies and the envelope(s) to the recovery storage 108. The recovery storage 108 may include the index 110, or the index 110 may otherwise be coupled to the recovery storage 108. More than one recovery storage 108 and/or indexes 110 may be utilized to store the data block copies and the envelope(s) for one or more production hosts 102 according to various embodiments. Further, the recovery storage 108 may comprise random access memory (RAM), hard drive memory, a combination of static and dynamic memories, direct access storage devices (DASD), or any other memory. The recovery storage 108 and/or the index 110 may comprise storage area network (SAN)-attached storage, a network-attached storage (NAS) system, or any other system or network.

The unique identifiers, discussed herein, may be utilized to locate each of the data block copies in the recovery storage 108 from the index 110. As discussed herein, the index 110 maps the envelopes to the data block copies according to the information included in the envelopes, such as the unique identifier, the physical address of the data block copies in the recovery storage 108, and/or the LBA of the data blocks in the primary storage 106 that correspond to the data block copies in the recovery storage 108. Accordingly, the recovery server 112 can utilize a sort function in coordination with the unique identifier, such as a physical address sort function, an LBA sort function, or any other sort function to locate the data block copies in the recovery storage 108 from the map provided in the index 110.

The recovery server 112 is also coupled to the recovery storage 108 and the index 110. In an alternative embodiment, the recovery server 112 may instruct the data tap 104 on how to create the index 110 utilizing the envelopes. The recovery server 112 may communicate any other instructions to the data tap 104 related to the data blocks, the data block copies, the envelope(s), or any other matters. Further, the recovery server 112 may be coupled to more than one recovery storage 108 and/or indexes 110.

As discussed herein, the index 110 may be utilized to locate the data block copies in the recovery storage 108 and/or the data blocks in the primary storage 106. Any type of information may be included in the envelope(s), such as a timestamp, a logical unit number (LUN), a logical block address (LBA), access and use of data being written for the data block, a storage media, an event associated with the data block, a sequence number associated with the data block, an identifier for a group of data block copies stemming from a historical view of the data, and so on.

In one embodiment, the envelopes are indexed according to the metadata in the envelopes, which may be utilized as keys. For example, a logical address index may map logical addresses found on the primary storage 106 to the data block copies in the recovery storage 108. A physical address index may map each physical data block copy address in the recovery storage 108 to the logical address of the data block on the primary storage 106. Additional indexing based on other payload information in the envelopes, such as snapshot identifiers, sequence numbers, and so on are also within the scope of various embodiments. One or more of the indexes may be provided for mapping and organizing the data block copies.

One or more alternate hosts 114 may access the recovery server 112. In exemplary embodiments, the alternate hosts 114 may request data as it existed at a specific point in time or the recovery point (i.e. the historical view of the data) on the primary storage 106. In other words, the alternate host 114 may request, from the recovery server 112, data block copies that reveal the state of the data as it existed at the recovery point (i.e., prior to changes or overwrites to the data by further data blocks and data block copies subsequent to the recovery point). The recovery server 112 can provide the historical view of the data as one or more snapshots to the alternate hosts 114, as discussed herein.

The alternate hosts 114, or any other device requesting and receiving restored data, can utilize the historical view to generate new data. The new data can be saved and stored to the recovery storage 108 and/or referenced in the index 110. The new data may be designated by users at the alternate hosts 114 as data that should be saved to the recovery storage 108 for access by other users. The recovery server 112 may create envelopes to associate with the new data and store the envelopes in the index 110 in order to organize and map the new data in relation to the other data block copies already referenced in the index 110. Accordingly, the alternate hosts 114 or other device can create various new data utilizing the historical views as the basis for the various new data.

Each of the alternate hosts 114 may include one or more data taps 104 according to one embodiment. In another embodiment, a single data tap 104 may be coupled to one or more of the alternate hosts 114. In yet a further embodiment, the data tap 104 functions may be provided by the recovery server 112.

An interface may be provided for receiving requests from the alternate host 114. For instance, a user at the alternate host 114 may select a recovery point for the data from a drop down menu, a text box, and so forth. In one embodiment, the recovery server 112 recommends data at a point in time that the recovery server 112 determines is ideal given parameters entered by a user at the alternate host 114. However, any server or other device may recommend recovery points to the alternate host 114 or any other device. Predetermined parameters may also be utilized for requesting recovered data and/or suggesting optimized recovery points. Any type of variables may be considered by the recovery server 112 in providing a recommendation to the alternate host 114 related to data recovery.

Figure 2:
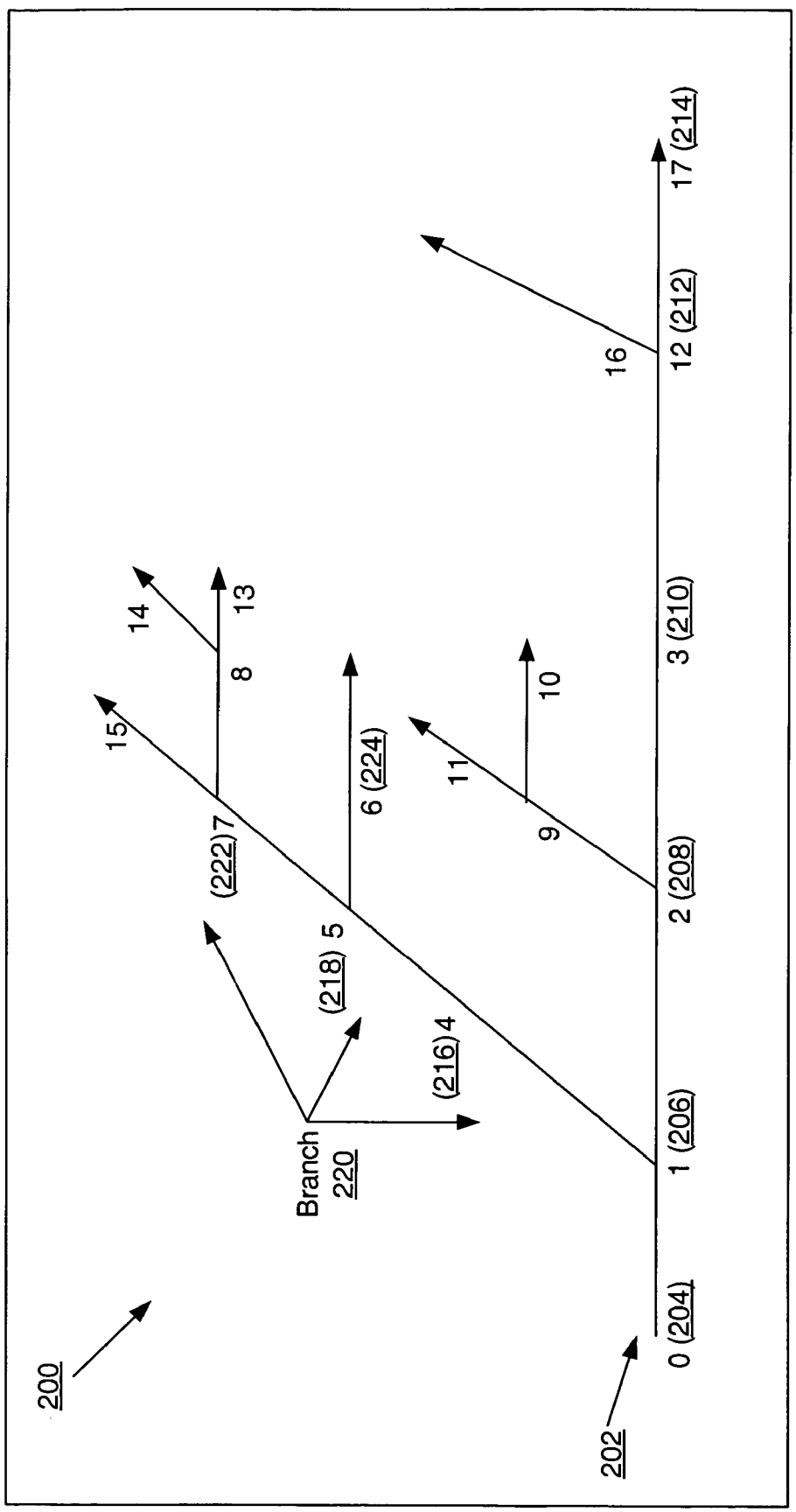
FIG. 2 shows an exemplary historical view and data block copy inheritance tree for representing data storage.

Referring now to FIG. 2, an exemplary branching data structure 200 for organizing and mapping data storage in accordance with one embodiment is shown. One or more branching data structures 200 reference the index 110 which maps the data block copies in the recovery storage 108 (FIG. 1). According to one embodiment, the branching data structures 200 include the index 110. However, the branching data structures 200 may comprise part of the recovery server 112 or any other device. The branching data structures 200 may be utilized to provide a high level view of the various data block copies mapped in the index 110 and how the data block copies relate to one another.

Accordingly, the branching data structures 200 can be used to reference the tracking of the data block copies in relation to other data block copies, through the index 110. In exemplary embodiments, the branching data structures 200 organize and map the data block copies generated by the various alternate hosts 114 or other devices, as well as the production host 102. One or more indexes 110 associated with the branching data structures 200 may be utilized to track the various new data generated by the alternate hosts 114 in relation to the historical views utilized to generate the various new data and in relation to the various new data generated by the other alternate hosts 114 or other devices.

For instance, a user may request a historical view of the data. The data block copies needed to generate the historical view of the data may be accessed and provided to the user in accordance with the user's request. If the user uses the historical view of the data to create new data blocks, the new data block copies from the particular historical view of the data forms a branch. Each of the branches formed by different devices or different user sessions on a same device are then tracked in relation to one another in the index 110 or any other medium for organizing and mapping the data block copies. While the index 110 can be utilized to access the data block copies from the recovery storage 108, the branching data structures 200 associated with the index 110 may be used to reference the index 110. The branching data structures 200 and the index 110 may comprise a single structure according to some embodiments.

The historical view of the data may be provided for any increment in time. Further, the user can generate new data using any of the historical views. Copies of the new data may also be generated and thus, more historical view may be utilized to continuously create new data from historical views of the data at any point in time. Accordingly, a series of branches may be formed so that the branching data structure indicates the relation of each of the data block copies to one another through the index 110.

The numbers zero (0) through seventeen (17) on the schematic diagram of the branching data structure 200 represent time. Any increment of time or other marker may be utilized in association with stored data block copies.

More than one data block copy may be created for each time illustrated in FIG. 2, depending upon the time increment. In other words, the numbers zero (0) through seventeen (17) on the branching data structure 200 may represent recovery point times, while the intervals between the numbers reflects increments of time. The increments may be arbitrarily long or short, but typically the times increment along a linear path increasing towards heads of the arrows along the branching data structure 200. For example, if time 0 (204) to time 1 (206) represents an hour increment, several data block copies may exist along the interval between time 0 (204) and time 1 (206). Alternatively, data block copies may not be generated at all between the time intervals. For instance, if the data blocks generated from the production host 102 do not change or the data blocks are not generated between time 1 (206) and time 2 (208), data block copies are not created during this time interval.

A horizontal line 202 shows unique identifiers associated with the data block copies at time 0 (204), time 1 (206), time 2 (208), time 3 (210), time 12 (212), and time 17 (214). At time 1 (206), a branch 220 is created. The branch 220 is created by a second device utilizing the historical view of the data blocks up to and including time 1 (206) to generate new data blocks. The alternate host 114 or an alternative second device can access and use the historical view at time 1 (206) to generate new data. A first device generating data blocks along the horizontal line 202 continues to generate data blocks from time 1 (206) to time 17 (214) and so on. A third device may request the historical view at time 2 (208) and access and use that historical view and create new data blocks modifying the data as it existed at time 2 (208). The new data blocks from the third device are tracked in relation to the copies of the data blocks from the first device and the second device that created the branch 220. Accordingly, the branching data structure 200 can organize the relationship between the data block copies from various devices or user sessions and map the data block copies from the index 110 to the recovery storage 108 for providing the data block copies in the recovery storage 108 to users. Although times are utilized to describe the branching data structure 200 in FIG. 2, the times may represent labels assigned to various points along the branching data structure 200. Any type of labels may be assigned to the branching data structure 200.

Each time new data blocks are copied to the recovery storage 108, the recovery server 112 may update the index 110. Accordingly, the index 110 can map each of the data block copies in relation to one another and can also be utilized to access the data block copies that may provide a historical view of all the data that exists at the point in time specified in the request that is submitted.

Similarly, time 6 (224) lies on the branch 220 created utilizing a historical view at time 5 (218). A fourth device accessed and used a time 5 (218) historical view and began generating new data blocks on the branch 220 marked by time 6 (224). Thus, another branch is created to track changes to the historical view at time 5 (218) in relation to the other data block copies (e.g., at time 5 (218), at time 1 (206), and so on). Any number of branches and/or branching data structures 200 may be generated for tracking the data block copies in relation to other data block copies. The various devices, such as the first device, second device, third device, and/or the fourth device may comprise a single device according to some embodiments.

One or more of the data block copies may be utilized to generate new data blocks and/or data block copies, as discussed herein. Accordingly, a data block copy or a set of data block copies may be modified more than one time. Each time the data block copies are modified, a new branch, such as the branch 220 discussed herein, may be created. Alternatively, the new data block copies may exist on a same branch. In other words, the same data blocks may be modified multiple times when a historical view is being utilized, and copies of the modified data blocks may lie on the same branch. In order to create a new branch, a historical view may also be utilized. Further, modification to the data block copies may result in more than one version of the data block copies. The branching data structure 200 and the index 110 can map the various versions of the data block copies in relation to one another and/or in relation to the other data block copies organized using the branching data structure 200 and the index 110.

Further, the times along the branching data structure 200 illustrated in FIG. 2 may be marked by a user generating the data blocks. In other words, the times corresponding to the unique identifiers may be marked by a user that wants to tag the data block copies or the data blocks at a particular time. For example, the user may create an event for a particular time, a text string with subject matter, or any other event information and associate the event information with the data block copies or the data blocks in order to mark the data block copies in the recovery storage 108. The "event markers" can help users to later locate and retrieve the data block copies. In a further embodiment, the times along the branching data structure 200 in FIG. 2 represent the timestamps assigned to the data block copies by the data taps 104 or other devices coupled to the production host 102, alternate hosts 114, or other devices.

The event markers may also tag a state of the data not associated with particular data block copies. For example, as discussed herein, data block copies may not be generated at particular time intervals due to a lack of data blocks being generated or due to a lack of changes in the data blocks, and accordingly, an event marker may tag a state of the data between data block copies, or any other state of the data not associated with the specific data block copies.

The branching data structure 200 can grow to accommodate any number of data block copies. More than one branching data structure 200 may be utilized to reference the index 110 for mapping the data block copies in the recovery storage 108. The unique identifiers may also be correlated to any other identifiers, such as the LBA of the data blocks, the LUN of a storage medium (e.g., one or more recovery storage 108), and so on.

Conversely, the branching data structure 200 may be reduced or cut back in order to prevent or slow the growing. For example, where the data block copies are repetitive or can be combined, the branches along the branching data structure 200 may be cut back to efficiently map and organize the data block copies via the branching data structure 200. Specifically, instances of changes to individual data block copies may be collapsed to show a resultant data block copy. For example, if data block copy 12 has changed five times, the last change to the data block copy may be maintained within the branching data structure 200 so that one instance of the data block copy 12 is tracked, rather than all five instances of the data block copy 12. Sections or branches of the branching data structure 200 may be cut back and/or eliminated in this manner. Any manner, however, of cutting back the branching data structure 200 may be employed according to various embodiments.

By creating a branching data structure 200 to reference the index 110, modifications to the data are stored along with the original data upon which those modifications are based. Modifications can continue to be stored as the modifications relate to the data upon which they are based, so that a hierarchical relationship is organized and mapped. By using a branching data structure, the various data block copies relationship to one another can be organized at a higher level than the index 110. As discussed herein, the branching data structure 200 and the index 110 may comprise a single structure according to some embodiments. According to further embodiments, the branching data structure 200, the index 110, and/or the data block copies may comprise a single structure.

In one embodiment, the primary storage 106 and the recovery storage 108 may comprise one storage medium. For example, the recovery storage 108 may be utilized for storing the data blocks using a map of the data blocks, such as the branching data structure 200 used by the recovery server 112. The map may be updated to reflect new data blocks being stored to the recovery storage 108 in such an embodiment.

In this embodiment, the production host 102 may be coupled to the recovery server 108, which in turn is coupled to a storage medium, such as the recovery storage 108. The recovery server 112 may include rules for implementing the branching data structure and a structure for the index 110. The recovery server 112 may use the index 110 and the LBA to determine the physical location of the data blocks in the recovery storage 108. The data block may then be provided to the production host 102 in response to any request(s) from the production host 102, such as a request for a historical view. When the production host 102 generates a data block and specifies an LBA, the recovery server 112 can allocate a free physical block in the recovery storage 108 for the data block. The recovery server 112 then updates the index 110 to map the LBA to the allocated free physical block and stores the data block generated into the allocated free physical block in the recovery storage 108.

Further, a data tap 104 may not be provided in accordance with such an embodiment. Instead, the recovery server 112 may perform the data tap 104 functions in this embodiment. The recovery server 112 may provide a historical view and store data blocks generated from the production host 102 utilizing the historical view, as discussed herein.

In one embodiment, a branching data structure, such as the branching data structure 200 described in FIG. 2, may be presented via a graphical user interface (GUI) to a user at the alternate host 114 or any other device. The branching data structure 200 in this embodiment may be associated with events, time stamps, and/or any other information. In such an embodiment, the user can select (e.g., click on) information on the branching data structure 200. When the user selects the information, the recovery server 112 can use the index 110 to locate data block copies corresponding to the particular information selected by the user in the recovery storage 108. The recovery server 112 can then retrieve the data block copies to provide the historical view that correlates with the information selected by the user. Any type of GUI may be provided to the user for allowing the user to select the data block copies of data blocks written by any user. Further, any type of structure may be utilized in association with the index 110 or any other medium for organizing and mapping information in the index 110 in order to locate the data block copies corresponding to the information in the recovery storage 108.

The information on the branching data structure 200 may also reveal to the user the data block copies' relationship with other data block copies in the branching data structure 200. The information may further include the location of the data block copies in the recovery storage 108, the unique identifier of the data block copies, the envelope(s) associated with the data block copies, and so on. Any manner of displaying information about the data blocks and/or the data block copies in the GUI for the branching data structure 200 may be employed. For example, information associated with the data block copy may be displayed as the user scrolls over a symbol along the branching data structure 200 or a pop up window may be displayed with information when the user clicks on a symbol along the branching data structure 200. Any type of user interface diagram, table, and so on may be utilized to display information about the data block copies to the user, as discussed herein.

In another GUI embodiment, the branching data structure 200 utilizes one or more words to represent the historical view of the data block copies referenced by the branching data structure 200. For instance, an event, a name, and/or a date and time may be utilized to correspond to the historical views represented along the branching data structure 200. Accordingly, a user can select one or more historical views by the words describing the historical views.

FIG. 3 shows an exemplary schematic diagram for recovery server 112 coordination of historical views. One or more envelopes arrive at the recovery server 112 via a target mode driver (TMD) 302. The TMD 302 responds to commands for forwarding the envelopes. Alternatively, any type of driver may be utilized for communicating the envelopes to the recovery server 112.

The envelopes may be forwarded by the data tap 104 utilizing a proprietary protocol 304, such as the Mendocino Data Tap Protocol (MDTP). A client manager 306 may be provided for coordinating the activities of the recovery server 112. The envelopes are utilized by the recovery server 112 to construct a recovery index 308. The recovery index 308 is then copied to the index 110 (FIG. 1) associated with the recovery storage 108 (FIG. 1). In order to update the index 110, the recovery index 308 may be updated and copied each time new envelopes arrive at the recovery server 112 or the recovery server 112 may update the index 110 with the new envelope information at any other time.

Optionally, a cleaner 310 defragments the data block copies and any other data that is stored in the recovery storage 108. As another option, a mover 312 moves the data block copies (i.e. the snapshots) in the recovery storage 108 and can participate in moving the data block copies between the recovery storage 108, the production host 102, the alternate hosts 114 (FIG. 1), and/or any other devices.

A recovery storage control logic 314 manages storage of the envelopes and the data block copies in the recovery storage 108 using configuration information generated by a configuration management component 316. A disk driver 318 then stores (e.g., writes) the envelopes and the data block copies to the recovery storage 108.

When a user requests a historical view of the data, as discussed herein, a historical view component 320 retrieves the data block copies needed to provide the historical view requested by a user. Specifically, the historical view component 320 references the recovery index 308 or the index 110 pointing to the data block copies in the recovery storage 108. The historical view component 320 then requests the data block copies, corresponding to the envelopes in the index 110, from the recovery storage control logic 314. The disk driver 318 reads the data block copies from the recovery storage 108 and provides the data block copies to the historical view component 320. The data block copies are then provided to the user at the alternate host 114 that requested the data.

As discussed herein, according to one embodiment, the historical view may be constructed utilizing the data block copies from the recovery storage 108 and the data blocks from the primary storage 106. Thus, the data block copies may be utilized to construct a portion of the historical view while the data blocks may be utilized to construct a remaining portion of the historical view.

The user of the historical view may utilize the historical view to generate additional data blocks, as discussed herein. Copies of the data blocks may then be stored in the recovery storage 108 along with corresponding envelopes. The recovery server 112 then updates the index 110 and/or the branching data structure 200 to include references to the new data block copies. Accordingly, the new data block copies are tracked via the index 110 in relation to other data block copies already stored in the recovery storage 108.

A management center 322 may also be provided for coordinating the activities of one or more recovery servers 112, according to one embodiment.

Although FIG. 3 shows the recovery server 112 having various components, the recovery server 112 may include more components or fewer components than those listed and still fall within the scope of various embodiments.

Figure 4:
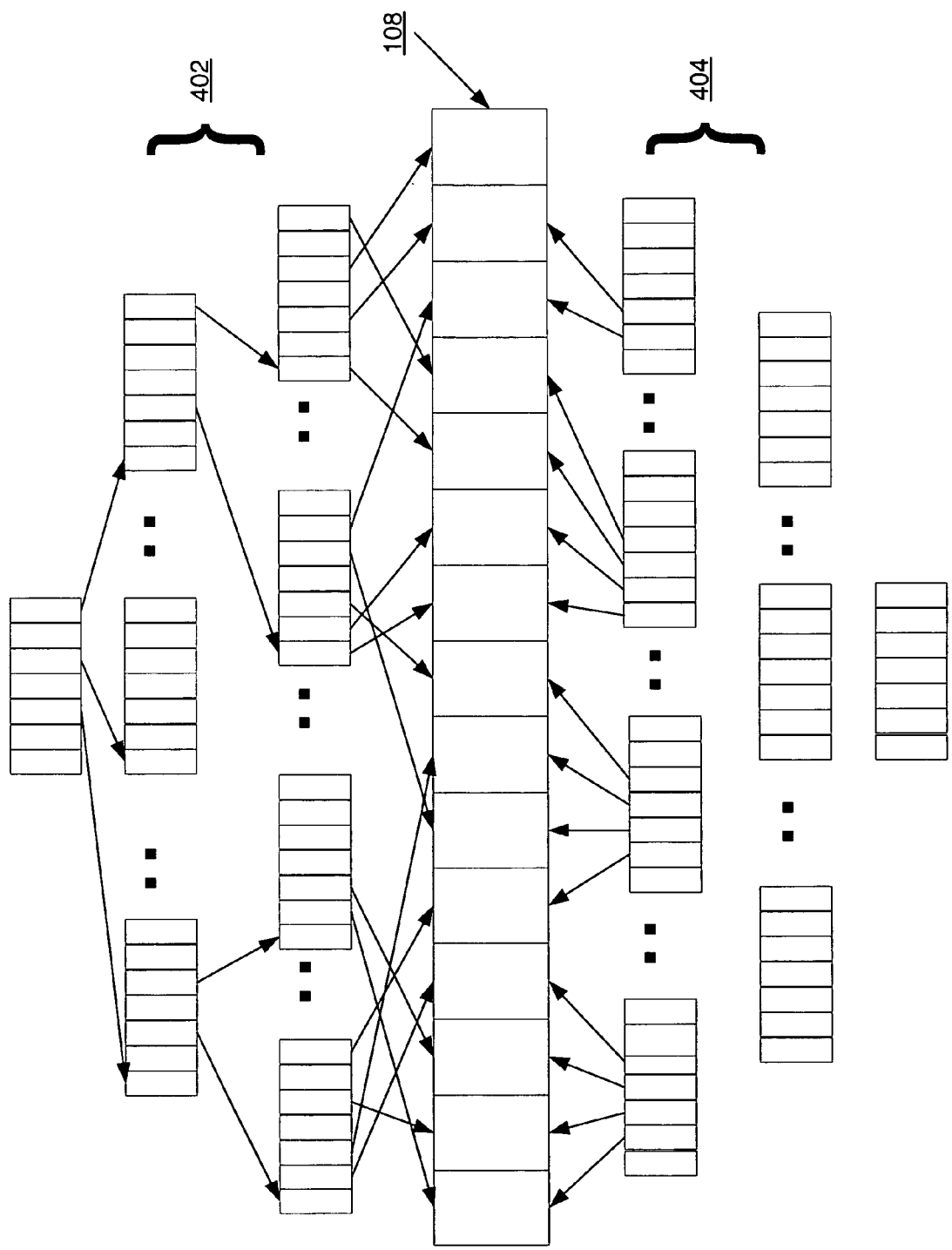
FIG. 4 shows exemplary mapping of the data block copies in the recovery storage.

FIG. 4 shows exemplary mapping of the data block copies in the recovery storage 108 in accordance with one embodiment. The upper structures 402 represent mapping of the data block copies in the recovery storage 108 from the index 110 sorted according to a logical order. The LBA or the unique identifier may be utilized to show the location of the data block copies in the recovery storage 108 for a given LBA. As discussed herein, when a same data block copy at a specified LBA is modified several times, possibly in different branches of the branching data structure 200, different versions of the data block copies may be located utilizing the index 110 along with the LBA and/or other unique identifiers, such as a branch identifier and a sequence number.

The lower structures 404 show how each of the data block copies are mapped to the recovery storage 108 from the index 110 sorted according to a physical block address. Thus, the logical address of the physical data block copy within the recovery storage 108 can be determined using the lower structures 404. Accordingly, the logical addresses of the data block copies in the recovery storage 108 at specified physical addresses is mapped by the lower structures 404. In addition to the LBA of the physical block, the index 110 may indicate identifiers, such as a branch identifier, a sequence number of a physical block at a specified physical address in the recovery storage 108, and so on. If the physical block does not include data, the index 110 may indicate that no data block copies and/or data blocks occupy the physical block in the recovery storage 108 and/or the primary storage 106, respectively.

Once the data block copies are located in the recovery storage 108, the data block copies may be combined in order to provide the historical view of the data as it existed at a point in time to the user. The historical view may be comprised of one or more data block copies that represent the state of the data at the point in time specified by the user. The user may then utilize the historical view to generate additional data blocks, as discussed herein.

Figure 5:
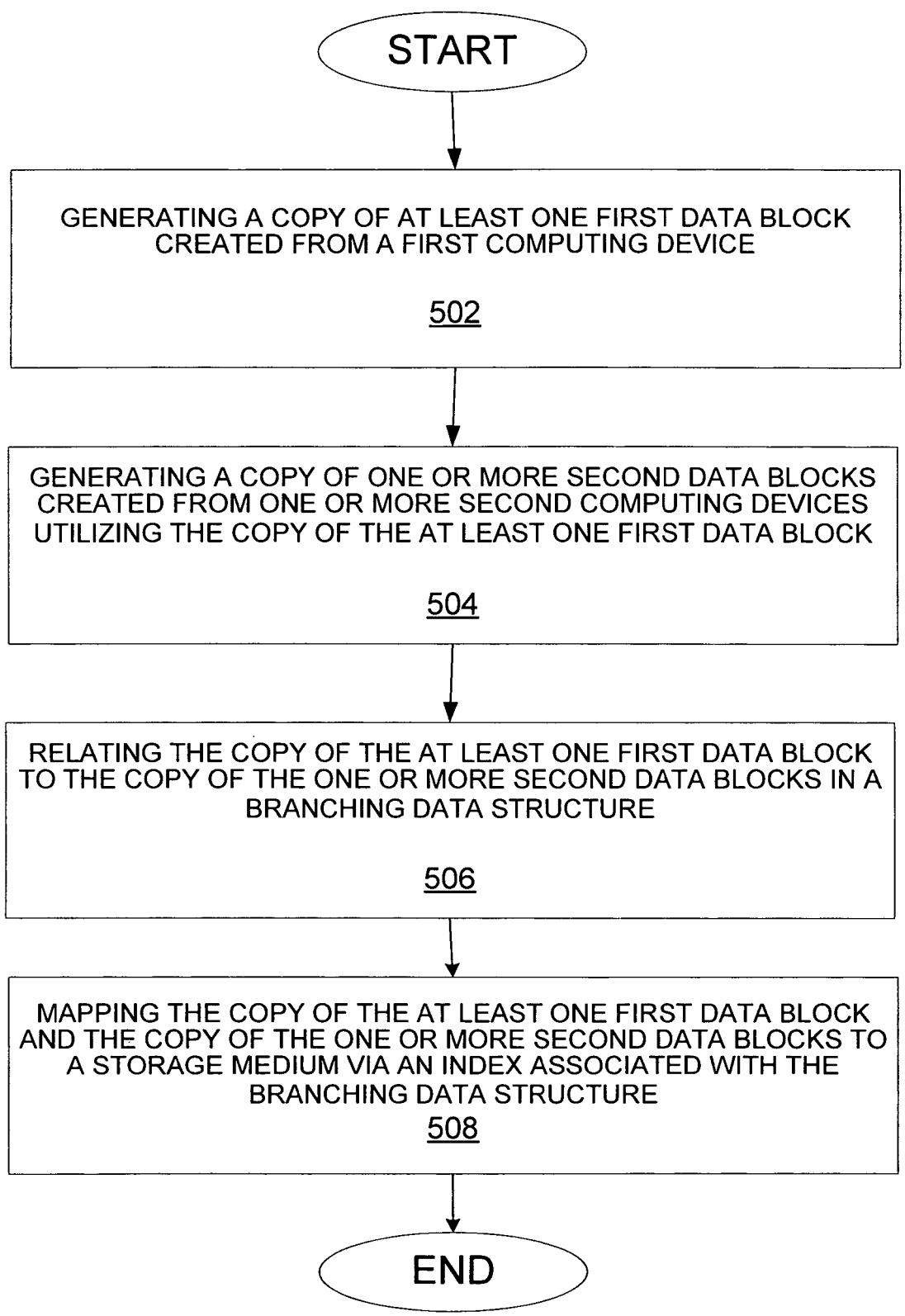
FIG. 5 shows a flow diagram illustrating an exemplary process for organizing and mapping data block copies.

Referring now to FIG. 5, a flow diagram illustrating an exemplary process for organizing and mapping data is shown. At step 502, a copy of at least one first data block created from a first computing device is generated. As discussed herein, the production host 102 or any other device may create one or more data blocks, which are then copied by the data tap 104 to the primary storage 106 and to the recovery storage 108 as a data block copy. As discussed herein, the one or more data blocks may be created by modifying existing data block copies.

At step 504, a copy of one or more second data blocks created from one or more second computing devices utilizing the copy of the at least one first data block is also generated. The alternate hosts 114 or any other devices can utilize one or more of the first data blocks comprising various historical views to create new data blocks, as one or more second data blocks. The one or more second data blocks created utilizing the copies of the at least one first data blocks may also be copied. Accordingly, users can continue to use historical views of data based on the copies of the at least one first data blocks and the copies of the one or more second data blocks to generate new data.

At step 506, the copy of the at least one first data block is related to the copy of the one or more second data blocks in a branching data structure. The branching data structure may be utilized to indicate a high level relationship of the data block copies to one another, as discussed herein.

At step 508, the copy of the at least one first data block and the copy of the one or more second data blocks is mapped to a storage medium via an index associated with the branching data structure. The storage medium may comprise the recovery storage 108, which stores the data block copies. The index 110 may map the data block copies from unique identifiers, or any other information, into the recovery storage 108. The branching data structure may references the index 110.

In one embodiment, a computer program may be embodied on a computer readable medium. The computer program may comprise instructions for organizing and mapping data comprising generating a copy of at least one first data block created from a first computing device, generating a copy of one or more second data blocks created from one or more second computing devices utilizing the copy of the at least one first data block, relating the copy of the at least one first data block to the copy of the one or more second data blocks in a branching data structure, and mapping the copy of the at least one first data block to the copy of the one or more second data blocks to a storage medium via an index associated with the branching data structure.

While various embodiments have been described above, it should be understood that they have been presented by way of example only, and not limitation. For example, any of the elements associated with the branching data structures may employ any of the desired functionality set forth hereinabove. Thus, the breadth and scope of a preferred embodiment should not be limited by any of the above-described exemplary embodiments.

What is claimed is:

1. A method for organizing and mapping data for data recovery, the method comprising:
generating a copy of at least one first data block created from a first computing device;
generating a copy of one or more second data blocks created from one or more second computing devices utilizing the copy of the at least one first data block;
relating the copy of the at least one first data block to the copy of the one or more second data blocks in a branching data structure configured to track the copy of the at least one first data block in relation to the one or more second data blocks;
mapping the copy of the at least one first data block and the copy of the one or more second data blocks to a storage medium for data recovery via an index of a recovery storage, the index associated with the branching data structure;
selecting the copy of the at least one first data block for a historical view for a user to view data of a point in time; and
associating at least one event with the copy of the at least one first data blocks or the copy of the one or more second data blocks, comprising: using the historical view to create the one or more second data blocks based on the at least one event.

2. The method recited in claim 1, wherein the first computing device and the one or more second computing devices comprise a single computing device providing one or more user sessions.

3. The method recited in claim 1, wherein the historical view of data comprises the copy of the at least one first data block at a point in time which is utilized to create the one or more second data blocks.

4. The method recited in claim 1, further comprising associating at least one event with a point in time district from one or more points in time associated with the copy of the at least one first data blocks and the copy of the one or more second data blocks.

5. The method recited in claim 1, wherein the branching data structure includes the index.

6. The method recited in claim 1, wherein the storage medium comprises a data block storage medium.

7. The method recited in claim 1, wherein the first computing device comprises a set of computing devices.

8. The method recited in claim 1, wherein the branching data structure, the index, the copy of the at least one first data block, and the copy of the one or more second data blocks comprise a single structure.

9. The method recited in claim 1, wherein the copy of the at least one first data block and the copy of the one or more second data blocks comprise data of various sizes.

10. The method recited in claim 1, further comprising tracking changes to at least one data block in a temporary storage medium.

11. A Computer readable medium having embodied thereon a program, the program being executable by a processor for performing a method for organizing and mapping data for data recovery, the method comprising:
generating a copy of at least one first data block created from a first computing device;
generating a copy of one or more second data blocks created from one or more second computing devices utilizing the copy of the at least one first data block;
relating the copy of the at least one first data block to the copy of the one or more second data blocks in a branching data structure configured to track the copy of the at least one first data block in relation to the one or more second data blocks;
mapping the copy of the at least one first data block and the copy of the one or more second data blocks to a storage medium for data recovery via an index of a recovery storage, the index associated with the branching data structure; and
selecting the copy of the at least one first data block for a historical view for a user to view data of a point in time, wherein the method further comprises associating at least one event with the copy of the at least one first data blocks or the copy of the one or more second data blocks and wherein the method further comprises using the historical view to create the one or more second data blocks based on the at least one event.

12. The computer readable medium having embodied thereon a program, the program being executable by a processor for performing a method for organizing and mapping data for data recovery as recited in claim 11, wherein the first computing device and the one or more second computing devices comprise a single computing device providing one or more user sessions.

13. The computer readable medium having embodied thereon a program, the program being executable by a processor for performing a method for organizing and mapping data for data recovery as recited in claim 11, wherein the historical view of data comprises the copy of the at least one first data block at a point in time which is utilized to create the one or more second data blocks.

14. The computer readable medium having embodied thereon a program, the program being executable by a processor for performing a method for organizing and mapping data for data recovery as recited in claim 11, wherein the method further comprises associating at least one event with an area of the storage medium not associated with the copy of the at least one first data blocks or the copy of the one or more second data blocks.

15. The computer readable medium having embodied thereon a program, the program being executable by a processor for performing a method for organizing and mapping data for data recovery as recited in claim 11, wherein the branching data structure includes the index.

16. The computer readable medium having embodied thereon a program, the program being executable by a processor for performing a method for organizing and mapping data for data recovery as recited in claim 11, wherein the storage medium comprises a data block storage medium.

17. The computer readable medium having embodied thereon a program, the program being executable by a processor for performing a method for organizing and mapping data for data recovery as recited in claim 11, wherein the first computing device comprises a cluster of computing devices.

18. The computer readable medium having embodied thereon a program, the program being executable by a processor for performing a method for organizing and mapping data for data recovery as recited in claim 11, wherein the branching data structure,the index, the copy of the at least one first data block, and the copy of the one or more second data blocks comprise a single structure.

19. The computer readable medium having embodied thereon a program, the program being executable by a processor for performing a method for organizing and mapping data for data recovery as recited in claim 11, wherein the copy of the at least one first data block and the copy of the one or more second data blocks comprise data of various sizes.

20. The computer readable medium having embodied thereon a program, the program being executable by a processor for performing a method for organizing and mapping data or data recovery as recited in claim 11, wherein the method further comprises tracking changes to at least one data block in a temporary storage medium.

21. A system for organizing and mapping data for data recovery, the system comprising:
a data tap for generating a copy of at least one first data block created from a first computing device and for generating a copy of one or more second data blocks created from one or more second computing devices utilizing the copy of the at least one first data block; and
a recovery storage configured to receive a selection of a copy of the at least one first data block for a historical view for a user to view data of a point in time, the recovery storage coupled to the data tap configured to store a branching data structure for relating the copy of the at least one first data block to the copy of the one or more second data blocks, the branching tree structure configured to track the copy of the at least one first data block in relation to the one or more second data blocks, and an index of a recovery storage, the index associated with the branching data structure for mapping the copy of the at least one first data block and the copy of the one or more second data blocks to the storage medium for data recovery, wherein the recovery storage further configured to store an association of at least one event with the copy of the at least one first data blocks or the copy of the one or more second data blocks and wherein the storage is further configured to store a selection of the copy of the at least one first data blocks as a historical view for a user to view data of a point in time and to create the one or more second data blocks based on the at least one event.

22. The system recited in claim 21, wherein the first computing device and the one or more second computing devices comprise a single computing device providing one or more user sessions.

23. The system recited in claim 21, wherein a historical view of data comprising the copy of the at least one first data block at a point in time is utilized to create the one or more second data blocks.

24. The system recited in claim 21, wherein the recovery storage is further configured to store an association of at least one event with an area of the recovery storage not associated with the copy of the at least one first data blocks or the copy of the one or more second data blocks.

25. The system recited in claim 21, wherein the branching data structure includes the index.

26. The system recited in claim 21, wherein the recovery storage comprises a data block storage medium.

27. The system recited in claim 21, wherein the first computing device comprises a cluster of computing devices.

28. The system recited in claim 21, wherein the branching data structure, the index, the copy of the at least one first data block, and the copy of the one or more second data blocks comprise a single structure.

29. The system recited in claim 21, wherein the copy of the at least one first data block and the copy of the one or more second data blocks comprise data of various sizes.

30. The system recited in claim 21, wherein the recovery storage is further configured to track changes to at least one data block in a temporary storage medium.

* * * * *